Figure 1:
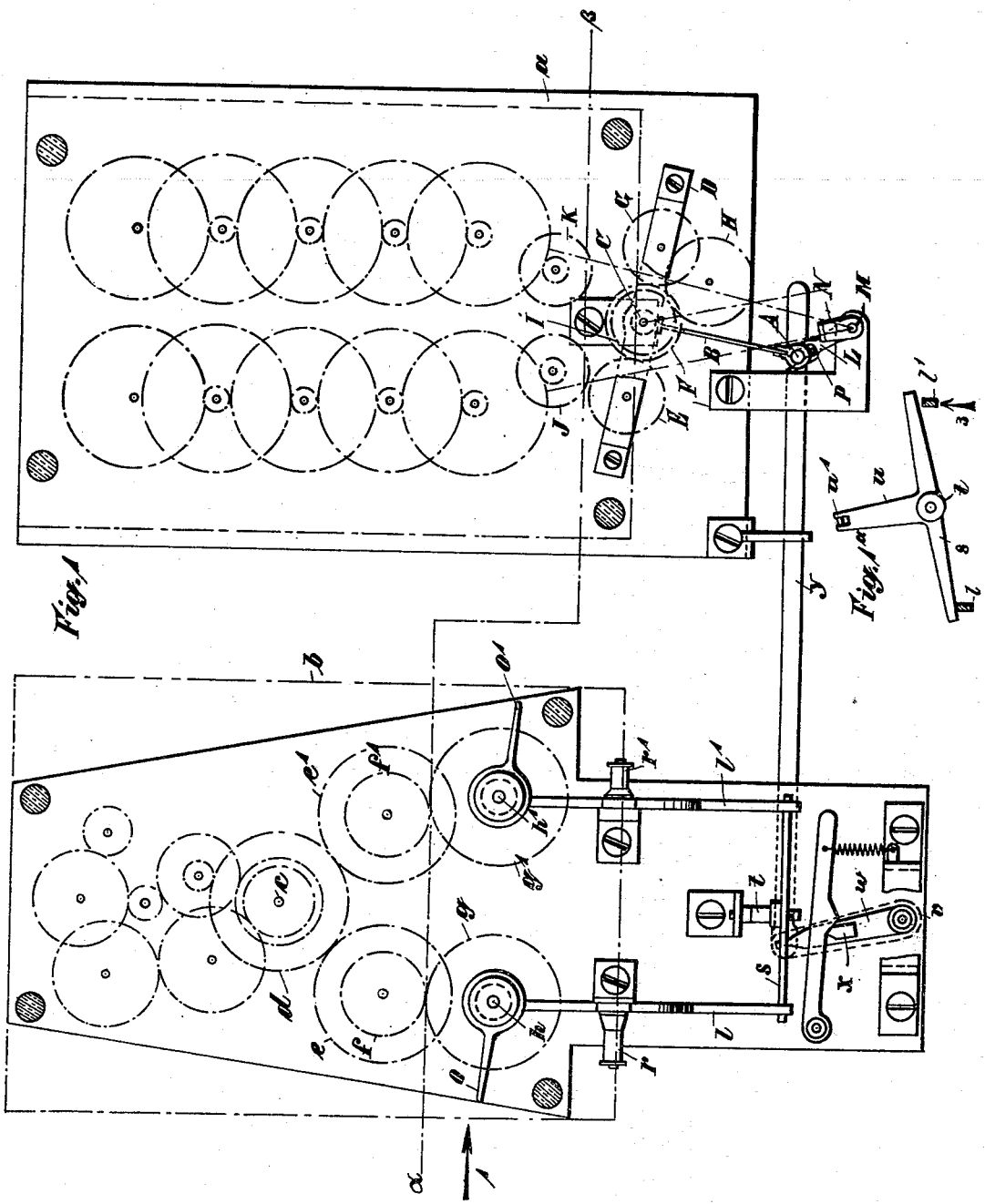

No. 623,063. Patented Apr. 11, 1899.
H. ARON.
APPARATUS FOR MEASURING AND RECORDING ELECTRIC CURRENTS.
(Application filed Feb. 17, 1899.)
(No Model.) 2 Sheets—Sheet 1.

WITNESSES:
INVENTOR
Hermann Aron
BY
Richardson
ATTORNEYS

No. 623,063. Patented Apr. 11, 1899.
H. ARON.
APPARATUS FOR MEASURING AND RECORDING ELECTRIC CURRENTS.
(Application filed Feb. 17, 1899.)
(No Model.) 2 Sheets—Sheet 2.
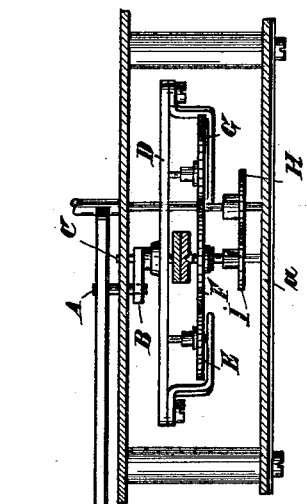
Fig. 2
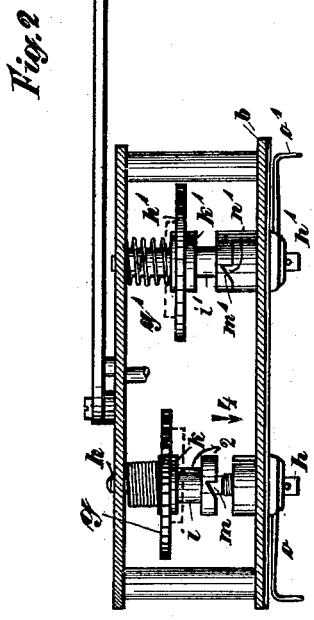
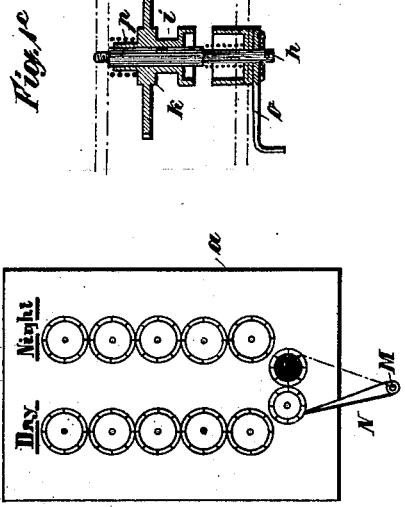
Fig. 4
Fig. 3
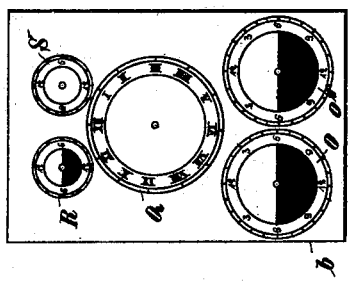
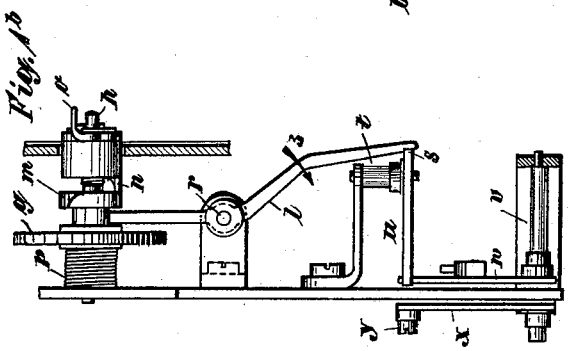
Fig. 5
WITNESSES:
Ella L. Giles
INVENTOR
Hermann Aron.
BY
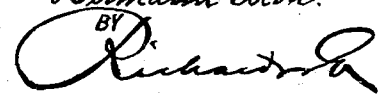
ATTORNEYS
THE NORRIS PETERS CO., PHOTO-LITHO., WASHINGTON, D. C.

UNITED STATES PATENT OFFICE.

HERMANN ARON, OF BERLIN, GERMANY.

APPARATUS FOR MEASURING AND RECORDING ELECTRIC CURRENTS.

SPECIFICATION forming part of Letters Patent No. 623,063, dated April 11, 1899.

Application filed February 17, 1899. Serial No. 705,339. (No model.)

*To all whom it may concern:*

Be it known that I, HERMANN ARON, a subject of the King of Prussia, German Emperor, and a resident of Berlin, Prussia, German Empire, have invented certain new and useful Improvements in Apparatus for Measuring and Recording Electric Currents, (for which I have filed an application for Letters Patent in Germany, dated July 15, 1898, Serial No. A. 5,900,) of which the following is a specification.

My invention relates to apparatus for measuring and recording electric currents of that kind which enables to charge at different rates the current consumed during predetermined periods of a day—for instance, during night and during day. According to this improved apparatus the amount of current delivered is automatically recorded on two separate dials, one for each rate to be charged— say one dial for night and one for day—and the recording motion is caused to automatically change between the two dials exactly at predetermined times.

In the accompanying drawings, Figure 1 is a front elevation of that part of the measuring and recording apparatus which contains the improvements of this invention. Fig. $1^a$ is a plan of lever $s$. Fig. $1^b$ is a side elevation of part of the apparatus as seen in the direction of the arrow 1 in Fig. 1. Fig. $1^c$ is a horizontal section through the clutch changing motion from one dial to the other. Fig. 2 is a section drawn to line $\alpha \beta$ of Fig. 1, and Fig. 3 is a front view of the two dials of the apparatus.

Referring to Figs. 1 and 2, $a$ is the dial-plate of an apparatus for recording the amount of electricity delivered. At the side of this dial-plate $a$ another dial-plate $b$ is arranged, belonging to a clockwork driven by the shaft $c$, carrying the hour-wheel $d$, which by means of intermediate gear-wheels $e$ $e'$ and $f$ $f'$ transmits motion to the wheels $g$ and $g'$, the speed of said gear-wheels $g$ $g'$ being but half the speed of wheel $c$, and accordingly the said wheels $g$ and $g'$ make but one revolution during twenty-four hours. The said two wheels $g$ and $g'$ are mounted loosely on their respective studs $h$ and $h'$, which are screwed to the dial-plate and on which the said wheels $g$ and $g'$ have a sliding motion in the longitudinal direction. Into the nave $k$ $k'$ of said wheels $g$ $g'$ grooves $i$ $i'$ are cut, into which engage levers $l$ $l'$, pivoted as at $r$ $r'$, as clearly shown in Fig. $1^b$. Into the face of said naves $k$ $k'$ notches $m$ $m'$ are cut, one side of which is inclined, as shown in Figs. $1^b$ and 2. The said notches are destined to be engaged by the catches $n$ $n'$, projecting from the collars of the pointers $o$ $o'$, carried by the studs $h$ $h'$. Springs $p$ $p'$, coiled around said studs $h$ $h'$, have the tendency to force the wheels $g$ $g'$ toward the said catches $n$ $n'$. Supposing now that the wheel $g$ be turned by shaft $c$ in the direction of the arrow 2, Fig. 2, the notch $m$, owing to the pressure of spring $p$, will at length come opposite the catch $n$ and engage the same. The wheel $g$ accordingly will be shifted in the direction of arrow 4, Fig. 2, and accordingly the lever $l$, engaged within the groove $i$, will be turned in the direction of arrow 3, Fig. $1^b$, thereby causing the three-armed lever $s$, Fig. $1^a$, to turn on its pivot $t$. The said lever $s$ by means of a fork $u'$, formed to its arm $u$, engages the end of a lever $w$, pivoted at $v$, the said lever $w$ being secured to a lever $x$, connected to a rod $y$, which connects the clockwork to the recording-train and which through the medium of said lever $x$ is shifted in the direction of its length. On the side of the recording apparatus the said connecting-rod $y$ acts, by means of a stud A and a spring B, on a frame D, tilting on its axis C. The said frame carries the gear-wheels E F G, to which motion is imparted from the counting-gear by means of the wheels H and I. According to the position of the rod $y$ in either of its extreme positions the wheels F E are thrown into gear with the intermediate wheel J, driving the train for recording the amount of electricity delivered by day, or the wheels F G are thrown into gear with the intermediate wheel K, driving the train for recording the electricity delivered by night. The stud A of the connecting-rod $y$ is engaged by a fork P of a lever L, which by means of a bolt M is secured to a finger N. Now as the rod $y$ is being shifted in one or the other direction, thereby coupling the driving mechanism of the counting apparatus with the recording-train for delivery by day or with the recording-train for delivery by night, the said finger N will always indicate on the dial-plate $a$ which one of the two recording-trains is working, as clearly shown by Fig. 3. Supposing the electric current delivered during the period from seven o'clock in the morning up to seven o'clock of night is to be charged at a lower rate than that delivered between seven o'clock of night and seven o'clock of morning, the finger $o$ is adjusted on "7 o'clock of morning" on the dial O of twenty-four hours, while the other finger $o'$ is adjusted on "7 o'clock of night" on the dial O' of twenty-four hours. To better mark the difference of the hours of day and the hours of night on the two dials O and O', the said dials may conveniently be divided into a half-field in black and a half-field in white, as indicated in Fig. 3. Owing to the circumstance that the wheels $g$ $g'$ are making but one revolution within twenty-four hours and that the naves $k$ and $k'$ have but one notch $m$ $m'$ it will be seen that but once within twenty-four hours the said notches $m$ $m'$ will be engaged by the corresponding catches $n$ $n'$ when coming opposite said notches. The finger $o$ being adjusted to "7 o'clock of morning" on dial O, the notch $m$ will be engaged by the catch $n$ when the main dial Q shows "7 o'clock of morning," and the rod $y$ will be shifted to throw the day recording-train into gear with the counting-gear. At seven o'clock of night, then, the notch $m'$ will be engaged by the corresponding catch $n'$ and the rod $y$ will be reversed, thereby throwing the day recording-gear out of connection with the counting-gear and simultaneously throwing the night recording-train into gear. The notch $m$, being engaged by the catch $n$, and the notch $m'$, being engaged by the catch $n'$, disengage as the said notches slide along the inclined face of the corresponding catch and by disengaging the naves of wheels $g$ and $g'$ are pushed back and the springs $pp'$ are again compressed and ready for use. The levers $l$ $l'$ on being pushed back do not affect the lever $s$, but leave it in its place to be struck by the next forward motion of either of the levers $l$ and $l'$.

As indicated in Fig. 3, a smaller dial R is arranged to show whether the main dial Q indicates the hours of day or of night, and a further dial S marks the seconds.

The number of dials to record the electric current delivered and the number of shifting devices to throw the said recording-dials into and out of gear might be still increased if more than two rates are to be charged for different periods of a day; but two recording-dials and two shifting devices at least are required.

I am aware that apparatus for measuring and recording electric currents according to different rates during different periods of a day are known; but

What I claim is—

1. In apparatus for measuring and recording electric currents of the kind, in which clockwork is employed to automatically change the rate during different periods of a day, the combination, with the clockwork, of wheels having a sliding motion on their axis, each wheel having in its nave a notch with an inclined face, a catch corresponding to the said notch and a pointer to adjust said catch to a predetermined time, a spring to force the wheel-nave toward the catch, a lever actuated by the wheel-nave, and mechanism to transmit the sliding motion of the wheels for the purpose of changing the rate of recording the current, substantially as and for the purpose set forth.

2. In apparatus for measuring and recording electric currents of the kind, in which clockwork is employed for automatically changing the rate during different periods of a day, the combination, with the clockwork, of wheels having a sliding motion on their axis, means, substantially as described, to effect said sliding motion at predetermined times and mechanism to transmit the said sliding motion to a tilting frame connected with the recording-trains, substantially as and for the purpose set forth.

3. In apparatus for measuring and recording electric currents of the kind, in which clockwork is employed for automatically changing the rate of recording during different periods of a day, the combination, with the clockwork, of wheels arranged to slide on their axis, means, substantially as described, to effect such sliding motion at predetermined times, mechanism, substantially as described, to transmit such sliding motion, a tilting frame to which such sliding motion is transmitted, gear-wheels carried by said tilting frame, the counting-gear for driving said gear-wheels and two recording-trains comprising gearing arranged to mesh alternately with the gear-wheels of the tilting frame, substantially as described.

4. In apparatus for measuring and recording electric currents of the kind, in which clockwork is employed for automatically changing the rate, the combination, with the clockwork, of two separate dials recording the electricity delivered during different, predetermined and adjustable periods of a day, a tilting frame to alternately actuate the recording-trains of said dials, intermediate gear-wheels carried by said tilting frame and in gear with the counting-gear, a connecting-rod shifted at predetermined, adjustable times to tilt the frame, mechanism, substantially as described, to perform the shifting motion of the connecting-rod under control of the clockwork, and a pointer indicating which one of the two dials is recording, substantially as and for the purpose set forth.

In testimony that I claim the foregoing as my invention I have signed my name in presence of two subscribing witnesses.

HERMANN ARON.

Witnesses:
HENRY HASPER,
WOLDEMAR HAUPT.